United States Patent
Bolle et al.

(10) Patent No.: US 9,329,345 B2
(45) Date of Patent: May 3, 2016

(54) HYBRID WAVELENGTH SELECTIVE SWITCH

(71) Applicant: Alcatel-Lucent USA Inc., Murray Hill, NJ (US)

(72) Inventors: Cristian Bolle, Murray Hill, NJ (US); David Neilson, Murray Hill, NJ (US); Mark P Earnshaw, Murray Hill, NJ (US); Roland Ryf, Murray Hill, NJ (US); Flavio Pardo, Murray Hill, NJ (US)

(73) Assignee: Alcatel Lucent, Boulogne-Billiancourt (FR)

( * ) Notice: Subject to any disclaimer, the term of this patent is extended or adjusted under 35 U.S.C. 154(b) by 64 days.

(21) Appl. No.: 14/087,714

(22) Filed: Nov. 22, 2013

(65) Prior Publication Data

US 2015/0147027 A1     May 28, 2015

(51) Int. Cl.
*G02B 6/293* (2006.01)
*G02B 6/35* (2006.01)
*G02B 6/12* (2006.01)

(52) U.S. Cl.
CPC .......... *G02B 6/2938* (2013.01); *G02B 6/12021* (2013.01); *G02B 6/352* (2013.01); *G02B 6/3518* (2013.01); *G02B 6/356* (2013.01); *G02B 6/3596* (2013.01); *Y10T 29/49* (2015.01)

(58) Field of Classification Search
CPC ............. G02B 6/2938; G02B 6/12021; G02B 6/3518; G02B 6/352; G02B 6/356; G02B 6/3596; Y10T 29/49
See application file for complete search history.

(56) References Cited

U.S. PATENT DOCUMENTS

| | | | | |
|---|---|---|---|---|
| 5,002,350 A * | 3/1991 | Dragone | ......................... | 385/24 |
| 5,671,304 A * | 9/1997 | Duguay | .......................... | 385/17 |
| 5,680,490 A * | 10/1997 | Cohen et al. | .................... | 385/24 |
| 5,960,133 A * | 9/1999 | Tomlinson | ...................... | 385/18 |
| 6,618,519 B2 * | 9/2003 | Chang et al. | .................... | 385/18 |
| 6,778,739 B1 * | 8/2004 | Jerphagnon et al. | ........... | 385/52 |
| 6,787,868 B1 * | 9/2004 | McGreer et al. | .............. | 257/425 |
| 6,885,823 B2 * | 4/2005 | Kato et al. | ...................... | 398/68 |
| 6,993,217 B2 * | 1/2006 | Maruyama et al. | ............. | 385/16 |
| 7,079,728 B2 * | 7/2006 | Nakagawa et al. | ............. | 385/37 |
| 7,212,704 B2 * | 5/2007 | Ducellier et al. | .............. | 385/16 |
| 7,236,660 B2 * | 6/2007 | Ducellier et al. | .............. | 385/24 |
| 7,386,206 B2 * | 6/2008 | Tabuchi et al. | .................. | 385/37 |
| 7,400,793 B2 * | 7/2008 | Tabuchi et al. | .................. | 385/24 |
| 8,406,624 B2 * | 3/2013 | Kimura et al. | .................. | 398/49 |
| 2001/0012424 A1 * | 8/2001 | Kato et al. | ...................... | 385/24 |
| 2002/0186434 A1 * | 12/2002 | Roorda et al. | ................ | 359/128 |
| 2003/0012509 A1 * | 1/2003 | Chang et al. | .................... | 385/50 |
| 2003/0202742 A1 * | 10/2003 | Kato et al. | ...................... | 385/24 |
| 2004/0151432 A1 * | 8/2004 | Tabuchi et al. | .................. | 385/37 |
| 2004/0165817 A1 * | 8/2004 | Nakagawa et al. | ............. | 385/24 |
| 2004/0252938 A1 * | 12/2004 | Ducellier et al. | .............. | 385/27 |
| 2005/0094930 A1 * | 5/2005 | Stone | .............................. | 385/16 |
| 2005/0249452 A1 * | 11/2005 | Maruyama et al. | ............. | 385/14 |

(Continued)

FOREIGN PATENT DOCUMENTS

| | | | |
|---|---|---|---|
| JP | 2002031768 | | 1/2002 |
| JP | 2006113465 A | * | 4/2006 |

*Primary Examiner* — Peter Radkowski
(74) *Attorney, Agent, or Firm* — Hitt Gaines, PC

(57) ABSTRACT

An optical apparatus, comprising a wavelength selective switch, the wavelength selective switch including: one or more planar lightwave circuits and a plurality of optical beam steering assemblies. Each one of the planar lightwave circuits have at least one arrayed waveguide grating located thereon.

17 Claims, 10 Drawing Sheets

(56) References Cited

U.S. PATENT DOCUMENTS

| | | |
|---|---|---|
| 2006/0045420 A1 | 3/2006 | Doerr et al. |
| 2006/0257091 A1* | 11/2006 | Tabuchi et al. ............... 385/132 |
| 2007/0160321 A1* | 7/2007 | Wu et al. ...................... 385/24 |
| 2007/0237451 A1 | 10/2007 | Colbourne |
| 2010/0111527 A1* | 5/2010 | Kimura et al. ................ 398/49 |
| 2012/0155871 A1* | 6/2012 | Fukashiro ..................... 398/50 |

* cited by examiner

HYBRID WAVELENGTH SELECTIVE SWITCH

TECHNICAL FIELD

The present disclosure is directed, to multi-wavelength selective switches for optical assemblies and methods of manufacturing and using the same.

BACKGROUND

This section introduces aspects that may help facilitate a better understanding of the invention. Accordingly, the statements of this section are to be read in this light and are not to be understood as admissions about what is prior art or what is not prior art.

Some wavelength selective switches devices are relatively expensive and large due to the requirement of free-space optics and several optical components assembled in a large sealed enclosure.

SUMMARY

One embodiment is an optical apparatus. The assembly comprises a wavelength selective switch, the wavelength selective switch including: one or more planar lightwave circuits (PLCs) and a plurality of optical beam steering assemblies. Each one of the PLCs have at least one arrayed waveguide grating (AWG) located thereon. A first AWG on a first one of the PLCs is configured to receive an optical signal having multiple wavelength channels from an input waveguide, and, to separate the multiple wavelength channels into discrete wavelength channels that are each optically coupled to one end of one waveguide of a first set of waveguides. Opposite ends of individual waveguides of the first set of waveguides are each separately located along an edge of the first PLC and spaced apart from each other. At least second and third AWGs are optically coupled to one end of second and third sets of waveguides, respectively, wherein opposite end of each one of the waveguides of the second and third sets are co-located with the opposite end of the respective individual waveguide of the first set of waveguides. Each one of the beam steering assemblies are configured to receive one of the discrete wavelength channels from the opposite end of the individual waveguides of the waveguides of the first set of waveguide, and, to at least steer the one discrete wavelength channel either to the co-located opposite end of the waveguide of the second set of waveguides, or, the co-located opposite end of the waveguide of the third set of waveguides.

In some such embodiments, each of the beam steering assemblies can include a micro-electro-mechanical (MEM) mirror configured to reflect the one discrete wavelength channel from the opposite end of the individual waveguides of the first set of waveguides to one of the co-located opposite end of the waveguide of at least the second and third set of waveguides. In some such embodiments, each of the beam steering assemblies can include a collimating micro-lens located between the opposite ends of the one waveguide of the first, second and third sets of waveguides and a planar reflective surface of the MEM mirror.

In some such embodiments, each of the beam steering assemblies can include a MEM mirror having a concave reflective surface configured to reflect the one discrete wavelength channel from the opposite end of the individual waveguides of the first set to either of the co-located opposite end of the waveguides of at least the second and third set of waveguides.

In some such embodiments, the plurality of optical beam steering assemblies can be arranged in a one-dimensional array.

In some such embodiments, the one or more PLCs and the plurality of optical beam steering assemblies can be located on a substrate of an optical telecommunication apparatus.

In some such embodiments, the first AWG can be configured as a de-multiplex device and the second and third AWGs can be configured as multiplex devices of an optical telecommunication apparatus.

In some such embodiments, the first, second and third AWGs can be located on the first PLC.

In some such embodiments, at least one of the waveguides of the first, second or third set of waveguides can cross at least one of the waveguides of the other of the set of waveguides.

In some such embodiments, the first AWG can be located on the first PLC and at least one of the second or third AWGs can be located on a second one of the PLCs, wherein the first and second PLCs are stacked together.

In some such embodiments, the first, second and third AWGs can be located on the first PLCs, and the apparatus can further include fourth, fifth and sixth AWGs located on a second one of the PLCs, wherein fourth, fifth and sixth AWGs can be optically coupled to one end of fourth, fifth and sixth sets of waveguides, respectively. In some such embodiments, opposite ends of each one of the waveguides of the fourth, fifth and sixth sets of waveguides can be co-located with the opposite end of one of the waveguide of the first, second and third sets of waveguides, respectively. In some such embodiments, each one of the beam steering assemblies can be configured to receive one of the discrete wavelength channels from the opposite end of one of the waveguides of the first set of waveguides, and, to steer the one discrete wavelength channel to one of the co-located opposite ends of the waveguides of one of the second, third, fourth, fifth or sixth sets of waveguides.

In some such embodiments, a surface of the first PLC, that the first AWG and first set of waveguides can be located on, opposes a surface of a second PLC having at least one of the other AWGs and the one other set of waveguides located thereon. Locations of the other AWG and other set of waveguide mirrors and locations of the first AWG and first set of waveguides are arranged such that the opposite ends of the waveguides of the other set of waveguides can be co-located with the opposite ends of the first set of waveguides.

In some such embodiments, the first AWG can be located on the first PLC, the second AWG can be located on a second one of the PLCs and the third AWG can be located on a third one of the PLCs, and, the first, second, and third AWGs can be stacked together.

Some such embodiments can further include another PLC, wherein the first PLC and the other PLC can be stacked together. A surface of the first PLC can be separated from a surface of the other PLCs that at least one other of the AWGs is located on, by a base layer of either the first PLC or the other PLC.

In some such embodiments, the co-located opposite ends of adjacent ones of the waveguides of first, second and third sets can separated from each other by an intra-channel separation distance equal to at least about 0.015 mm.

In some such embodiments, each of the co-located opposite ends of the first, second and third waveguides can be separated from other ones of the co-located opposite ends of the first, second and third waveguides that are configured to carry a different one of discrete wavelength channels, by at least about 0.5 mm.

In some such embodiments, the co-located opposite ends of pairs of adjacent ones of the waveguides of first, second and third sets can be separated from each other by an intra-channel separation distance that differ from each other by at least about 50 percent.

Another embodiment is method of manufacturing an optical assembly that comprises fabricating a wavelength selective switch. Fabricating the wavelength selective switch includes providing one or more PLCs on a substrate, each one of the PLCs having at least one AWG located thereon. A first AWG on a first one of the PLCs is configured to receive an optical signal having multiple wavelength channels from an input waveguide, and, to separate the multiple wavelength channels into discrete wavelength channels that are each optically coupled to one end of one of a first set of waveguides. Opposite ends of the individual waveguides of the first set of waveguides are each separately located along an edge of the first PLC and spaced apart from each other. At least second and third AWGs are optically coupled to one end of second and third sets of waveguides, respectively, wherein opposite ends of each one of the waveguides of the second and third sets are co-located with the opposite end of the respective individual waveguide of the first set of waveguides. Fabricating the wavelength selective switch also includes providing a plurality of optical beam steering assemblies on the substrate. Each one of the beam steering assemblies are configured to receive one of the discrete wavelength channels from the opposite end of the individual waveguides of the first set of waveguides, and, to at least steer the one discrete wavelength channel either to the co-located opposite end of the waveguide of the second set of waveguides, or, the co-located opposite end of the waveguide of the third set of waveguides.

Another embodiment is method of using an optical assembly that comprises switching an input optical signal having multiple wavelength channels using a wavelength selective switch. Switching includes transferring the input optical signal from an input waveguide to a first AWG located on a first one of the PLCs of the wavelength selective switch. Switching includes separating, in the first AWG, the multiple wavelength channels into discrete wavelength channels. Switching includes transmitting the separated discrete wavelength channels to different individual waveguides of a first set of waveguides optically coupled to the first AWG wherein opposite ends of the individual waveguides of the first set of waveguides are each separately located along an edge of the first PLC and spaced apart from each other. Switching includes steering the separated discrete wavelength channels from the opposite end of the individual waveguides of the first set through one of a plurality of optical beam steering assemblies at least either to an end of one waveguide of a second set of waveguides, or, to an end of one waveguide of a third set of waveguides, wherein the end of the one waveguide of the second or third set of waveguides are co-located with the opposite end of the individual waveguides of the first set of waveguides.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that a person of ordinary skill in the relevant arts will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the present disclosure provide a compact, low-cost optical assembly with a hybrid multi-wavelength selective switch with fewer optical components and reduced number and sizes of free optic spaces between the optical components, than certain existing switches.

Figure 1:
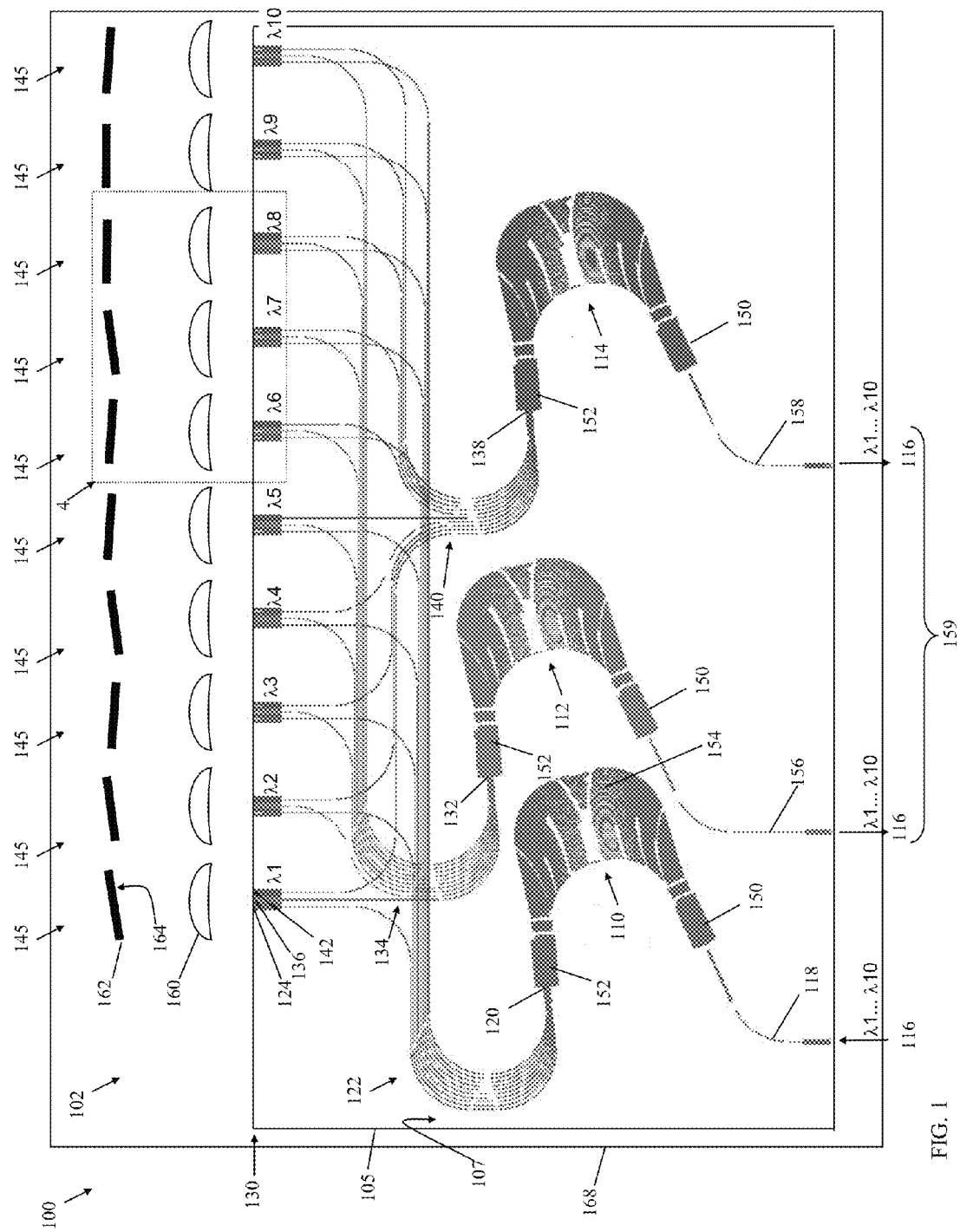
FIG. 1 presents a schematic plan view of an example embodiment of an optical apparatus of the disclosure.

One embodiment of the disclosure is an optical assembly. FIG. 1 presents a schematic plan view of an example embodiment of an optical apparatus 100 of the disclosure.

The apparatus 100 comprises a wavelength selective switch 102. The switch 102 includes one or more planar lightwave circuits (PLCs) 105. Each one of the PLCs has at least one arrayed waveguide grating (AWG) 110, 112, 114 located thereon, e.g., on surface 107, which in some cases is a planar surface 107. A first AWG 110 on a first one of the PLCs 105 is configured to receive an optical signal 116 having multiple wavelength channels (e.g., λ1 ... λ10), from an input waveguide 118.

In some embodiments, the optical signal 116 can be in any wavelength band used in optical communications, e.g. in the S band (about 1460 nm to 1530 nm), the C band (about 1530 nm to 1565 nm) or the L band (about 1565 nm to 1625 nm). In some embodiments, the multiple channels can be separated by a characteristic spacing $\Delta f$, corresponding to a regular, even spacing of frequency components by a same frequency difference, e.g., about 100 GHz, 50 GHz, or 10 GHz.

The first AWG 110 separates the multiple wavelength channels into discrete wavelength channels (e.g., one of λ1 to λ10) that are each optically coupled to one end 120 of one waveguide of a first set of waveguides 122. Opposite ends 124 of individual waveguides of the first set of waveguides 122 (e.g., individual ones of waveguides 122) are each separately located along an edge 130 of the first PLC 105 and spaced apart from each other.

The switch 102 further includes at least second and third AWGs 112, 114. The second AWG 112 is coupled to the ends 132 of a second set of waveguides 134 and each one of the opposite ends 136 of the second set of waveguides 134 are co-located with the opposite end 124 of the respective individual waveguides of the first set of waveguides 122 (e.g., the opposite end 124 of one of the waveguides 122). The third AWG 114 is coupled to the ends 138 of a third set of waveguides 140 and each one of the opposite ends 142 of the third set of waveguides 140 are co-located with the opposite end 124 of the respective individual waveguides of the first set 122 (e.g., the opposite end 124 of the same one of the waveguides 122). As illustrated in the example embodiment shown in FIG. 1 each one of the opposite ends 142 of the third set of waveguides 140 can also be co-located with the opposite ends 136 of the individual waveguides of second set of waveguides 134.

The switch 102 also includes a plurality of optical beam steering assemblies 145, wherein each one of the beam steering assemblies 145 are configured to receive one of the discrete wavelength channels from the opposite end 124 the individual waveguides of the waveguides of the first set of waveguides 122 (e.g., the opposite end 124 of one of the waveguides 122). The optical beam steering assemblies 145 are configured to at least steer the one discrete wavelength channel either to the co-located opposite end 136 of the waveguide of the second set of waveguides 134, or, the co-located opposite end 142 of the waveguide of the third set of waveguides 140. In such a configuration, as depicted in FIG. 1, the switch 102 can serve as a 1×2 switch.

The term co-located opposite ends of the waveguides, as used herein, refers to the nearest grouping of waveguide ends 124, 136, 142, from each of the different sets of waveguides 122, 134, 140 that a single of optical beam steering assembly 145 can steer the discrete wavelength channel to.

As illustrated in FIG. 1, in some embodiments of the apparatus 100, the AWGs 110, 112, 114 can include a first free-space propagation region 150, a second multimode portion 152, and a plurality of single-mode waveguide portion 154. One of ordinary skill in the art would be familiar with other types of arrayed waveguide grating configurations. Non-limiting example embodiments of suitable AWGs are presented in U.S. application Ser. No. 13/228,636, filed Sep. 9, 2011, which is incorporated by reference herein in its entirety.

In some embodiments the first AWG 110 can be configured as a de-multiplex device and the second and third AWGS 112, 114 are configured as multiplexing devices of the apparatus 100 configured as an optical telecommunication apparatus (e.g., an optical transceiver apparatus).

As further illustrated in FIG. 1, embodiments of the apparatus 100 can further include at least output optical waveguides 156, 158, optically coupled to the second and third AWGs 112, 114, respectively. The output optical waveguides 156, 158 are configured to receive the discrete wavelength channels (e.g., the separated channels of λ1 through λ10), steered from the individual waveguides of the first set of waveguides to one of the waveguides of the second or third sets of waveguides 134, 140, and, recombined into an optical output 159 that includes the multiple wavelength channels (e.g., the combined channels of λ1 through λ10), after passing through one of the second AWG 112 or the third AWG 114.

Although the first AWG 110 is depicted as being coupled to a single input waveguide 118, one skilled in the pertinent arts would understand how, in some embodiments, multiple input waveguide, each carrying multi-channel optical signals 116, could be connected to the first AWG 110. One skilled in the pertinent arts would appreciate how, in some embodiments, any of the AWGs 110, 112, 114 could be configured to receive the input optical signal 116 and the depicted output waveguides 156, 158 could be configured as an input waveguide. One skilled in the pertinent arts would appreciate how, in some embodiments, a plurality of output waveguides (e.g., a plurality of each of waveguides 156, 158) could be optically coupled to the second or third AWGs 112, 114 respectively.

As illustrated in FIG. 1, in some embodiments of the apparatus 100, to facilitate beam steering, the assemblies 145 can include a micro-electro-mechanical (MEM) mirror 160 configured to reflect the one discrete wavelength channel (e.g., λ1) from the opposite end 124 of one of the individual waveguides of the first set of waveguides to one of the co-located opposite ends 136, 142 of the waveguide of at least the second and third set of waveguides 134, 140.

As further illustrated in FIG. 1, in some embodiments, to facilitate beam steering, each of the assemblies 145 can include a collimating micro-lens 162. The lens 162 is located between the opposite ends 124, 136, 142 of one of the individual waveguides of the first, second and third set of waveguides 122, 134, 140 and a reflective surface 164 (e.g., a planar reflective surface) of the MEM mirror 160.

In some embodiments of the apparatus 100, to facilitate beam steering, each the beam steering assemblies 145 includes a MEM mirror 160 having a concave reflective surface 164 that is configured to reflect channel (e.g., λ1) from the opposite end 124 of one of the individual waveguides of the first set 122 to either of the co-located opposite ends 136, 142 of the waveguides of at least the second and third set of waveguides 134, 140.

One of ordinary skill in the pertinent arts would be familiar with various types of MEM device designs to facilitate beam steering. For instance, in some embodiments, the MEM mirror can be coupled to a MEM device that is configure to rotate the reflective surface 164 about two different rotation axis, e.g., to steer the beam laterally (e.g., within the plane of a PLC) or vertically (e.g., above and/or below the plane of a PLC).

As illustrated in FIG. 1, to facilitate a compact optical apparatus 100 and beam steering assembly 145, the plurality of the beam steering assemblies 145 can be arranged in a one-dimensional array. In some embodiments, for instance, the MEM mirrors 160 can be arranged in a one-dimensional array, and the optional collimating lens 162, can be arranged in a one-dimensional array.

As further illustrated in FIG. 1 the one or more PLCs 105 and the plurality of optical beam steering assemblies 145 can be located on a substrate 168 of the apparatus 100. For example the substrate can be configured as a subassembly substrate of an optical telecommunication apparatus 100.

As illustrated in FIG. 1, in some embodiments, to simplify the fabrication and to facilitate providing a vertically compact apparatus 100, the first, second and third AWGs 110, 112, 114 can all be located on a same first PLC 105. For instance, the first, second and third AWGs 110, 112, 114 can be arranged substantially as a linear one-dimensional array on the one PLC 105. In some embodiments, at least one of the waveguides of the first, second or third set of waveguides crosses at least one of the waveguides of the other of the set of waveguides. For instance, at least one of the waveguides of the first set of waveguides 122 can cross at least one of the waveguides of the second set or the third set of waveguides 134, 140. Permitting at least some of the waveguides of the first, second or third set of waveguides to cross each other can facilitate a more laterally compact arrangement of the AWGs 110, 112, 114 on PLC 105 and thereby facilitate a compact apparatus 100. Such crossings, however, can lead to optical power losses of the output signal 159 compared to the input signal 116. In alternative embodiments of the apparatus 100, however, the AWGs can be arranged on a PLC such that the coupled waveguide sets do not cross each other, and thereby minimize such optical power losses.

Figure 2:
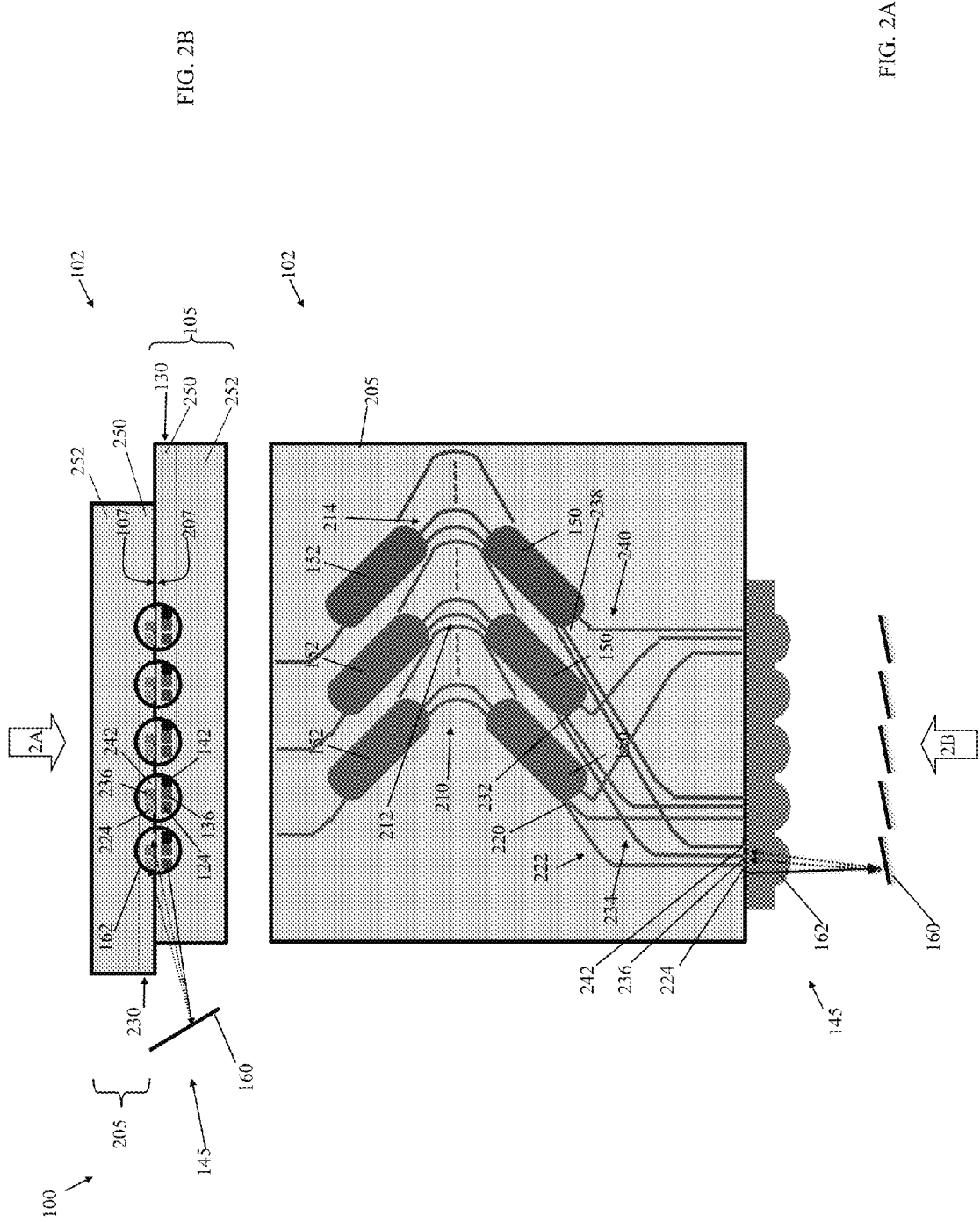
FIG. 2A presents a detail plan view of an example embodiment of the optical apparatus from top-down view, along view line 2A, shown in FIG. 2B.
FIG. 2B presents a detail cross-sectional view of a portion of an example embodiment of the optical apparatus 100 having the two planar lightwave circuits (PLCs) from side-view, along view line 2B, shown in FIG. 2A.

To facilitate a laterally compact apparatus 100, some embodiments of the switch 102 can include two or more PLCs stacked together, where at least one AWG is on each PLC. As a non-limiting example, FIG. 2A presents a detail plan view of an example embodiment of the optical apparatus 100 of the disclosure having two PLCs 105, 205 from top-down view 2A, shown in FIG. 2B. FIG. 2B presents a detail cross-sectional view of a portion of an example embodiment of the optical apparatus 100 having the two PLCs 105, 205 from side-view 2B shown in FIG. 2A. For clarity in FIG. 2B, only a single mirror 160 of the optical beam steering assembly 145 is depicted off to the side of the PLCs. One of ordinary skill would understand that there could be a plurality of such mirrors 160 positioned as depicted in FIG. 2A.

For the depicted embodiment, the first PLC 105 can have first, second and third AWGs 110, 112, 114 located thereon and their ends 120, 132, 140 can be optically coupled to the waveguides of first, second and third waveguide sets 122, 134, 140, similar to that discussed in the context of FIG. 1. FIG. 2B depicts the opposite ends 124, 136, 142 of the waveguides of the first, second and third waveguide sets 122, 134, 140 along the edge 130 of the first PLC 105.

Similarly, the second PLC 205 can include fourth, fifth and sixth AWGs 210, 212, 214 located thereon and their ends 220, 232, 240 can be optically coupled to the waveguides of fourth, fifth and sixth waveguide sets 222, 234, 238, similar to that discussed in the context of FIG. 1. FIG. 2B depicts the opposite ends 224, 236, 242 of the waveguides of the fourth, fifth and sixth sets of waveguides 222, 234, 240 along the edge 230 of the second PLC 205. The opposite ends 224, 236, 242 of each one of the waveguides of the fourth, fifth and sixth sets of waveguides are co-located with the opposite end of one of the waveguides of the first, second and third sets of waveguides 122, 134, 140.

Each one of the beam steering assemblies 145 are configured to receive one of the discrete wavelength channels from the opposite end 124 of one of the waveguides of the first set of waveguides 122, and, to steer the one discrete wavelength channel to one of the co-located opposite ends 136, 142, 224, 236, 242 of the waveguide of one of the second, third, fourth, fifth or sixth sets of waveguides 134, 140, 222, 234, 240. In such a configuration, the switch 102 can serve as a 1×5 switch.

In some embodiments of the apparatus 100 having a switch 102 with a stack of PLCs, at least two of the PLCs can be arranged in a face-to-face configuration. Such a configuration can facilitate co-locating the ends (e.g., ends 124, 136, 142, 224, 236, 242) of the waveguide a short distance away from each other, e.g., so as to reduce the range of physical motion of the beam steering assembly 145.

For instance, as illustrated in FIG. 2B, the opposite end 124 of individual waveguides of the first set waveguides on the first PLC 105 opposes the opposite ends (e.g., one or more ends 224, 236, 242) of the individual waveguides of at least one other set of waveguides (e.g., one or more sets 222, 234, 240) that are located on a second PLC 205 and configured to carry the same discrete wavelength channel.

In some embodiments of the apparatus 100 having a switch 102 with a stack of PLCs, the arrangements of at least one of the AWGS and sets of waveguides on the second PLC can mirror the locations of least one of the AWGS and sets of waveguides on the first PLC. Such a configuration can facilitate co-locating the ends (e.g., ends 124, 136, 142, 224, 236, 242) of the waveguides a short distance away from each other, and, facilitate a more laterally compact PLC design.

Consider, for instance, an embodiment such as illustrated in FIGS. 2A and 2B. A surface 107 of the first PLC 105 (e.g., having an optical layer 250 located on a base layer 252) that the first AWG 110 and first set of waveguides 122 are located on, opposes a surface 207 of a second PLC 205 (e.g., also having an optical layer 250 located on a base layer 252). The second PLC 205 has at least one other AWG (e.g., at least one of AWGs 210, 212, 214, and in some embodiments, all three AWGs) and at least one other set of waveguides (e.g., at least one of sets 222, 234, 240, and in some embodiments all three) are located thereon. The locations of the other AWG (e.g., one of AWGs 210, 212, 214) other set of waveguides (one of sets 222, 234, 240) can mirror the locations of the first AWG 110 and first set of waveguides 122 such that the opposite ends of the waveguides of the other set of waveguides (e.g., ends 224, 236, 242) are co-located with the opposite ends of the first set of waveguides (e.g., ends 124).

In some embodiments, each of the AWGs (e.g., AWGs 210, 212, 214) and sets of waveguides (e.g., sets 222, 234, 240) on the second PLC 205 mirrors one of the AWGs (e.g., AWGs 110, 112, 114) and sets of waveguides (e.g., sets 122, 134, 140) on the first PLC 105.

Figure 3:
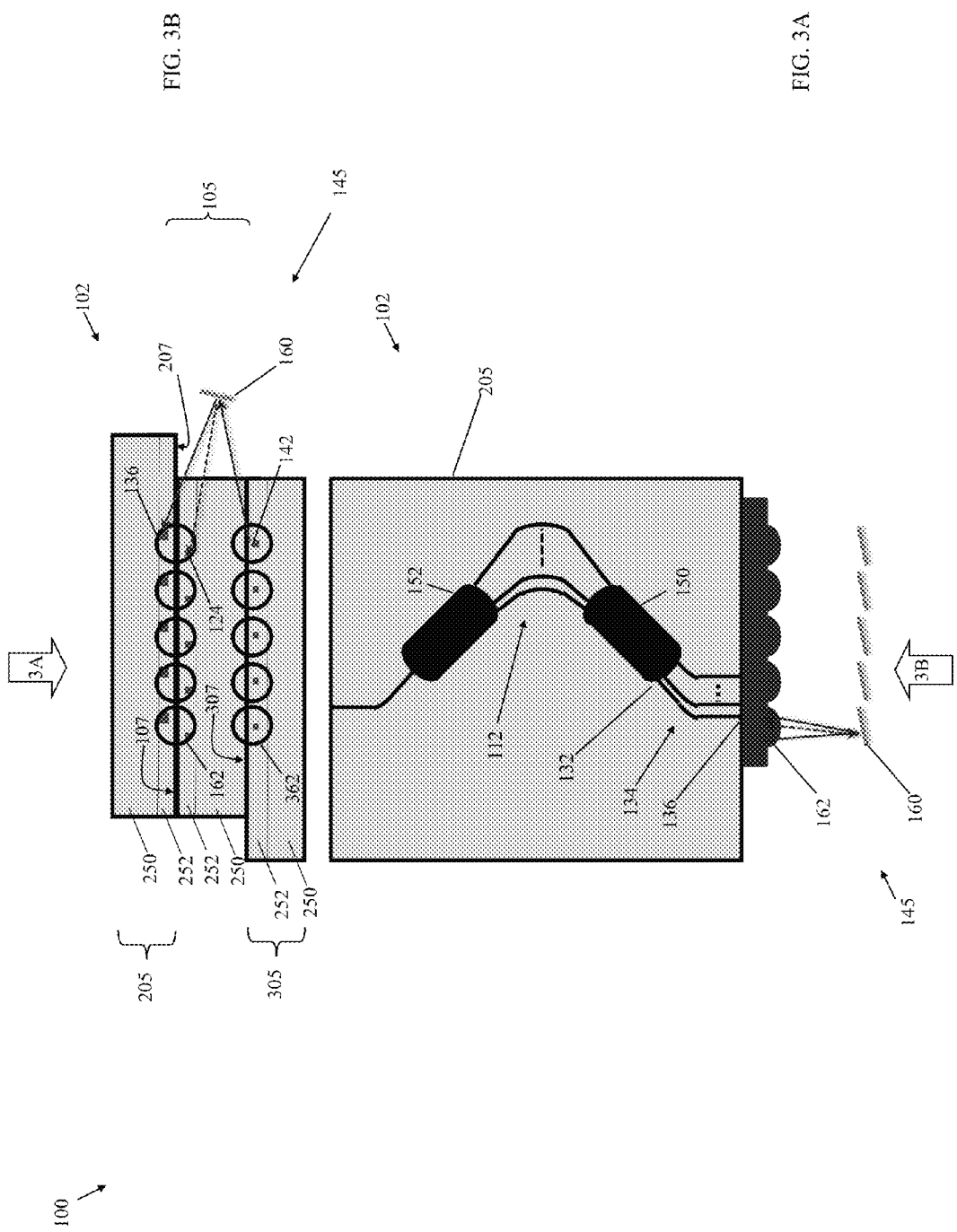
FIG. 3A presents a plan view of an example embodiment of an optical apparatus having a plurality of PLCs from top-down view, along view line 3A, shown in FIG. 3B.
FIG. 3B presents a cross-sectional view of a portion of the example embodiment from side-view, along view line 3B, shown in FIG. 3A.

FIGS. 3A and 3B illustrate another example of the apparatus 100 having a switch (e.g., a 1×2 switch) that includes a stacked arrangement of PLCs. FIG. 3A presents a plan view of an example embodiment of an optical apparatus 100 of the disclosure having a plurality of PLCs (e.g., three PLCs) from top-down view 3A, shown in FIG. 3B. FIG. 3B presents a cross-sectional view of a portion of the example embodiment from side-view 3B shown in FIG. 3A. Again, for clarity, in FIG. 3B, a single mirror 160 of the optical beam steering assembly 145 is depicted off to the side of the PLCs 105, 205, 305.

For the embodiment depicted in FIGS. 3A and 3B, the first AWG 110 is located on the first PLC 105 and at least one of the second or third AWGs 112, 114 (e.g., AWGs 112), is located on a second one of the PLCs (e.g., PLC 205), and the first and second PLCs 105, 205 are stacked together. Additionally, there can be additional PLCs (e.g., a third PLC 305 and in some embodiments additional PLCs) stacked together with the other PLCs 105, 205, and the each PLC has at least one AWG located thereon.

For instance, in some embodiments, the first AWG 110 is located on the first PLC 105, the second AWG 112 is located on a surface 207 of the second PLC 205, and the third AWG 114 is located on a surface 305 of the third PLC 307. The first, second and third PLCs 105, 205, 305 are stacked together. For instance, as illustrated in FIG. 3B, the second PLC 205 can be stacked onto the first PLC 105 and the first PLC 105 can be stacked onto the third PLC 305. As such only the second AWG 112 and second set of waveguides 134 are depicted in the top down view shown in FIG. 3B.

As further illustrated in FIG. 3B, in some embodiments, similar to the embodiment depicted in FIG. 2B, two of the PLCs (e.g., PLC 105 and PLC 205) can be stacked together in a face-to-face arrangement. In the embodiment depicted in FIG. 3B, however at least two of the PLCs (e.g., PLC 105 and PLC 305) are stacked together in a face-to-end arrangement. For instance, the surface 107 of the first PLC 105 that the first AWG 110 is located on is separated from a surface 307 of the other PLC (e.g., PLC 305), that at least one other of the AWGs is located on (e.g., AWG 114), by a base layer 252 of either the first PLC or the other PLC, in this case, the base layer 252 of the first PLC 105. In some embodiment, having the AWGs (e.g., one or more of AWGs 110, 112, 114), and the associated optically coupled sets of waveguides (e.g., one or more of sets 122, 134, 140), separated by such a base layer 252 can advantageously reduce optical power losses and/or cross-talk between the AWGS or waveguide sets.

As further illustrated in FIG. 3B, in some embodiments to facilitate beam steering, the optical steering assemblies 145 can each include a second lens (e.g., micro-lens 362) located between the mirror 160 of the assembly 145 and the ends (e.g., end 142) of the set of waveguides (e.g., set 140) located on the PLC (e.g., the third PLC 305) that is separated from at least one of the other sets of waveguides (e.g., set 122) by a PLC base layer (e.g., base layer 252 of the first PLC 105).

Based on the examples presented in FIGS. 2A-3B, one skilled in the pertinent arts would appreciate how the switch 102 could include additional PLCs that are stacked together in various face-to-face or face-to-end arrangements.

Figure 4:
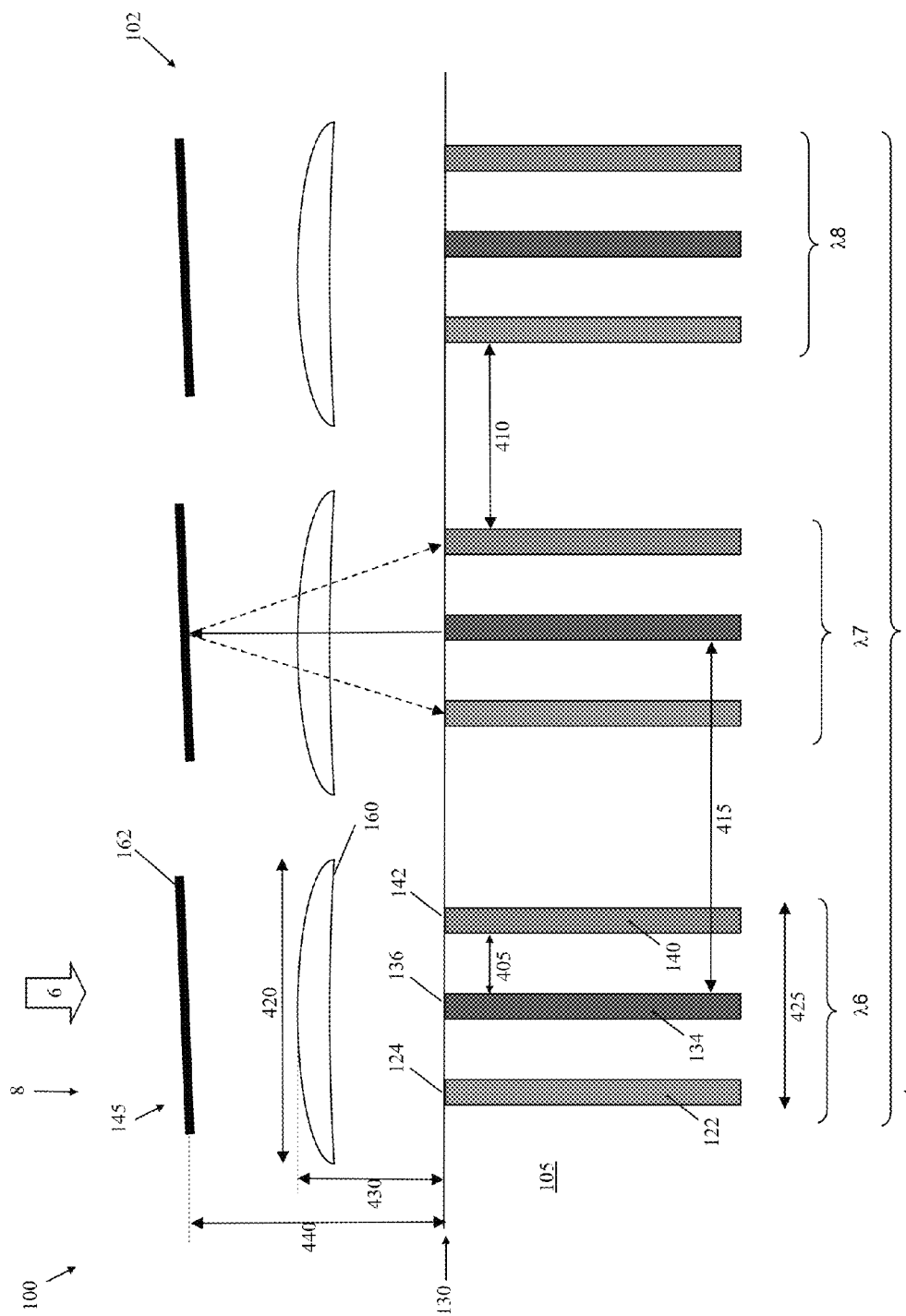
FIG. 4 shows a plan view of a detailed portion 4, of an embodiment of the switch, as depicted in FIG. 1.

FIG. 4 shows a plan view of a detailed portion 4 of the embodiment of the switch 102 as depicted in FIG. 1 showing the co-located opposite ends 124, 136, 142 of the waveguides of first, second and third sets of waveguides 122, 134, 140 separately located along the edge 130 of the PLC 105. As illustrated, one waveguide of each of the different sets of waveguides 122, 134, 140 are configured to carry different discrete channels (e.g., $\lambda 6, \lambda 7, \lambda 8$, respectively) of the optical signal 116 (FIG. 1). To reduce optical power losses and crosstalk between waveguide having co-located opposite ends 124, 136, 142, the co-located opposite ends of adjacent ones of the waveguides of first, second and third sets (e.g., ends 122 and 136, or, ends 136 and 140) are separated from each other by an intra-channel separation distance 405 equal to at least about 0.015 mm. In some embodiments, to facilitate a laterally compact PLC design, the co-located opposite ends of adjacent ones of the waveguides of first, second and third sets are separated from each other by a maximum distance 405 equal to about 0.15 mm or less.

As further illustrated in FIG. 4, in some embodiments to reduce optical power losses and crosstalk between waveguides each of the co-located opposite ends of the first, second and third waveguides configured to carry one of the discrete wavelength channels (e.g., $\lambda 7$) are separated from other ones of the co-located opposite ends of the first, second and third waveguides configured to carry a different one of discrete wavelength channels (e.g., $\lambda 8$) by an inter-channel separation distance 410 of least about 0.2 mm. In some embodiments, to facilitate a laterally compact PLC design, the maximum distance 410 equals about 2 mm or less.

As further illustrated in FIG. 4, in some embodiments to reduce optical power losses and crosstalk between waveguides of the same set of waveguide (e.g., set 134) the pitch 415 between adjacent ones of the waveguide of the same set (e.g., set 134) is maintained at least about 0.5 mm for substantially the entire length of the waveguides, e.g., from the end 132 connected to the AWG 112 to the opposite end 136 (FIG. 1).

As illustrated in FIG. 4, in some embodiments, the intra-channel separation distance 405 between ends of adjacent waveguides can be regularly distributed. For instance, the ends of each of the adjacent waveguides, e.g., the distance 405 between end 124 and end 136, and, the distance 405 between end 136 and end 142 can be the same within 10 percent, and in some embodiments, within 5 percent and in some embodiments, within 1 percent.

Figure 5:
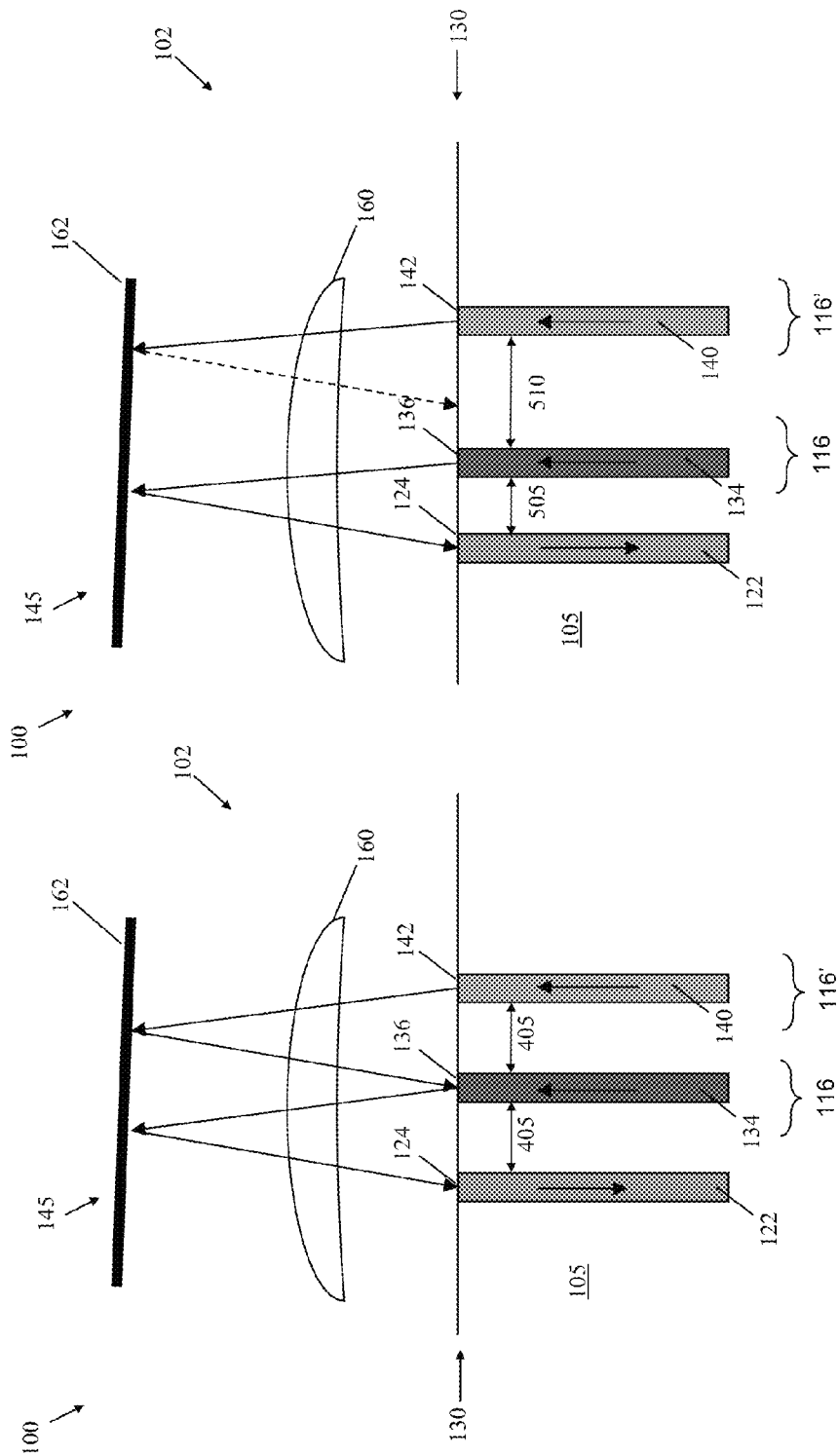
FIG. 5A shows a plan view of a portion of the embodiment of the switch analogous to the view depicted in FIG. 4.
FIG. 5B shows a plan view of a detailed portion of the embodiment of the switch analogous to the view depicted in FIG. 4.

In other embodiments, it can be advantageous for the intra-channel separation distance 405 between adjacent waveguides to be irregularly distributed. For instance, FIGS. 5a and 5b show plan views of a portion of the embodiment of the switch 102 analogous to that depicted in FIG. 4. FIGS. 5a and 5b show waveguides configured to carry a same discrete wavelength channel (e.g., any one of $\lambda 1$ through $\lambda 10$, in the present example, $\lambda 6$) where the co-located opposite ends 124, 136, 142 are regularly and irregularly distributed, respectively.

As illustrated in FIG. 5A in an embodiment where the intra-channel separation distances 405 are regularly distributed, when there is an input optical signal 116, e.g., from a waveguide of set 134, the beam steering apparatus 145 can be actuated to steer the signal 116 from the waveguide's end 136 to the end 124 of the waveguide of set 122. However, when there is a second input signal 116', e.g., from a waveguide of set 140, the beam steering apparatus 145 can also undesirably steer the signal 116' to the end 136 of the waveguide of set 134 that is carrying the first input signal 116.

However, as illustrated in FIG. 5B in an embodiment, where the separation distances 505 are irregularly distributed, the second input signal 116' is not steered to the end 136 of the waveguide of set 134 that is carrying the first input signal 116. As a non-limiting example, in some embodiments, the intra-channel separation distances between different pairs of ends of adjacent waveguides can differ by at least about 50 percent and in some embodiments at least about 100 percent. For example, in some embodiments, when a separation distance 505 between one pair of adjacent ends 124, 136 equals about 0.015 mm, then a separation distance 510 between another pair of adjacent ends 136, 142 can equal about 0.022 mm, and in some embodiments, about 0.030 mm.

Returning to FIG. 4, as further illustrated, in some embodiments, to facilitate uniform collimation of the optical signal 116, each of the lenses 160 can have a width 420, parallel to the PLC edge 130, that is greater than a total length 425 across the co-located opposite ends 124, 136, 142 of the waveguides of the different sets 122, 136, 140 that are separately located along the edge 130 of the PLC. For instance, in some embodiments, the length 420 of the lens 160 is at least about 10 percent, and in some embodiments, at least about 50 percent greater than the total length 425 across the co-located opposite ends. For instance, in some embodiments, the width 420 of the lens is at least about 0.5 mm.

One of ordinary skill in the pertinent art would understand how the separation distance 430 between a lens 160 of the assembly 145 and the PLC edge 130 could depend on the material composition of the lens 160, the curvature and thickness of the lens and on other factors well-known to those of ordinary skill. In some embodiments, the separation distance 430 is in a range of 0.5 mm to 1 mm.

One of ordinary skill in the pertinent art would understand how the separation distance 440 between a mirror 162 of the assembly 145 and the PLC edge 130 could depend upon the curvature or planarity of the mirror 162 the number of co-located ends 124, 136, 142 both on the first PLC 105, and on other PLCs, the intra-channel separation distance 405, intra-channel separation distance 410 and upon other factors well-known to those of ordinary skill. In some embodiments, the separation distance 440 is in a range of 0.5 mm to 2 mm.

Figure 6:
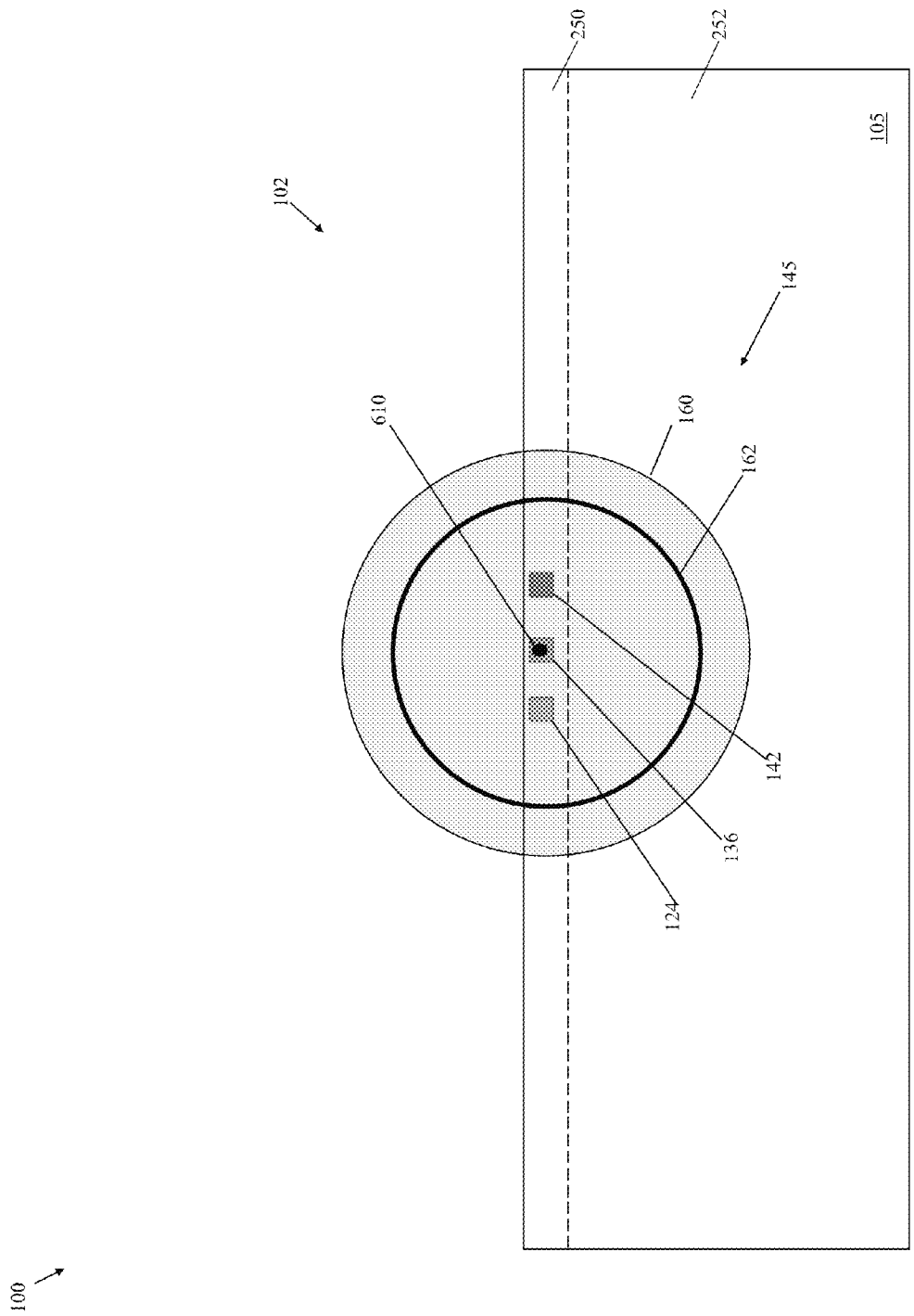
FIG. 6 presents a side view of a detailed portion of the embodiment of the switch along view line 6, as depicted in FIG. 4.

FIG. 6 presents a side view of a detailed portion of the embodiment of the switch 102 along view line 6 as depicted in FIG. 4. FIG. 6, shows co-located opposite ends 124, 136, 142 of the waveguides of first, second and third sets of waveguides 122, 134, 140 (FIG. 4). As further illustrated (FIGS. 4 and 6) the waveguides of the different sets 122, 134, 140 can be located in an optical layer 250 of the PLC 105 (e.g., optical grade silica, silicon or other materials familiar to those of ordinary skill in the pertinent art). The optical layer can be located on a base layer 252 (e.g., a handle layer of silicon). As further illustrated, in some such embodiments, the lens 160 and mirror 162 of the steering assembly can be spherically shaped and oriented such that central locations of the co-located ends 124, 136, 142, the lens 160 and the mirror 162 are along a common axis 610 (e.g., running in and out of the side view displayed in FIG. 6). Having the co-located ends 124, 136, 142, the lens 160 and the mirror 162 centrally aligned along the common axis 610 can facilitate efficient beam steering to each of the co-located ends 124, 136, 142 with a reduce range of motion of the mirror 162.

Figure 7:
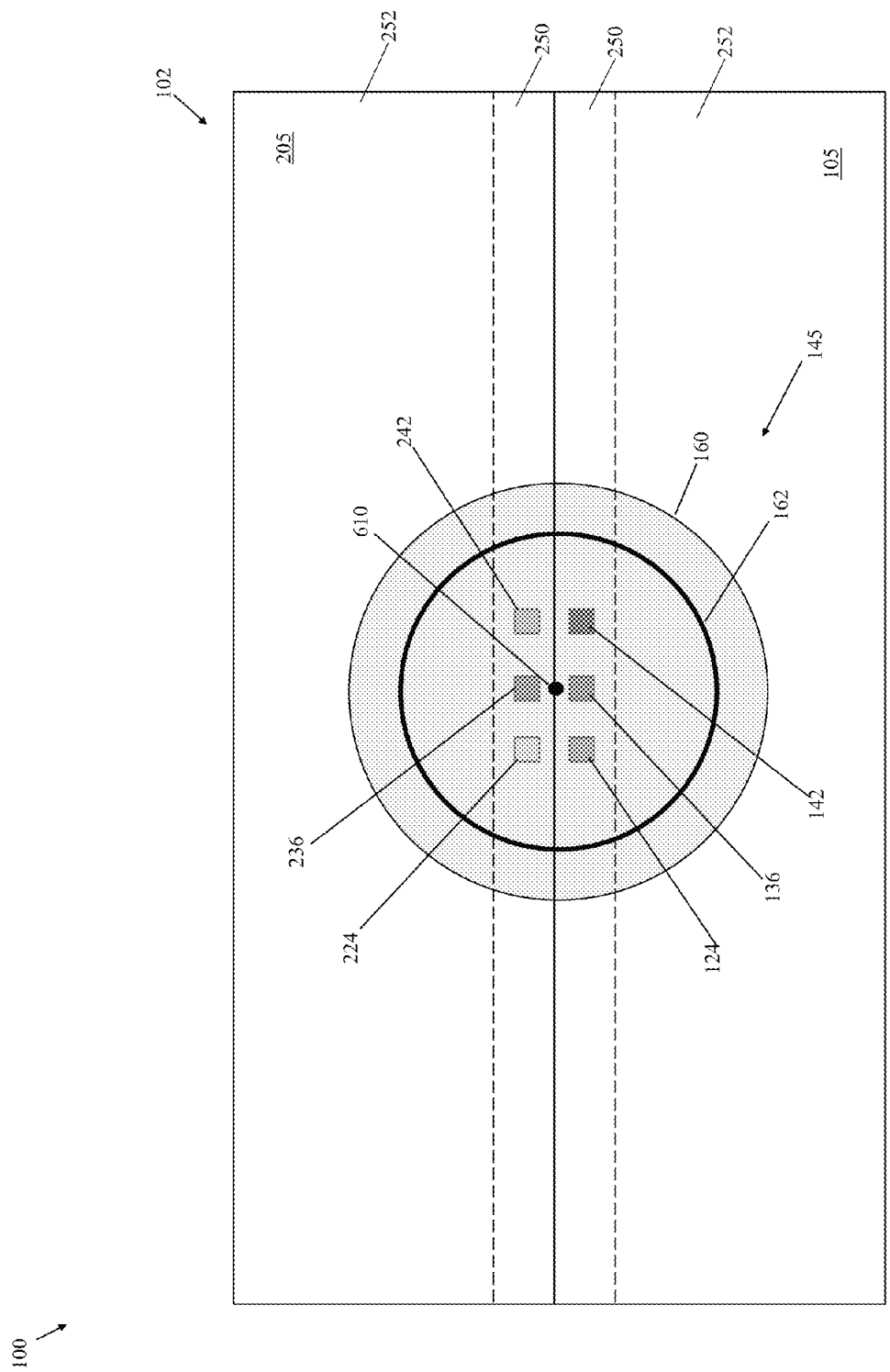
FIG. 7 presents a side-view of a detailed portion of the embodiment of the switch, similar to that depicted in FIG. 6, but for an embodiment of the switch that includes a stack of PLCs.

FIG. 7 presents a side-view of a detailed portion of the embodiment of the switch 102, similar to that depicted in FIG. 6, but for an embodiment of the switch 102 that includes a stack of PLCs such as depicted in FIGS. 2A-2B. As illustrated, the optical layer 250 of a first PLC 105 having the waveguides of a first, second and third sets 122, 134, 140 and their ends 124, 136, 142 thereon, can oppose the optical layer 250 of a second PLC 205 having waveguides of a fourth, fifth, and sixth sets 222, 234, 240 (FIGS. 2A-2B) and their ends 224, 236, 242 thereon. Once again, to facilitate efficient beam steering, in some such embodiments, central locations of the co-located ends 124, 136, 142 224, 236, 242 the lens 160 and the mirror 162 are along a common axis 610.

Figure 8:
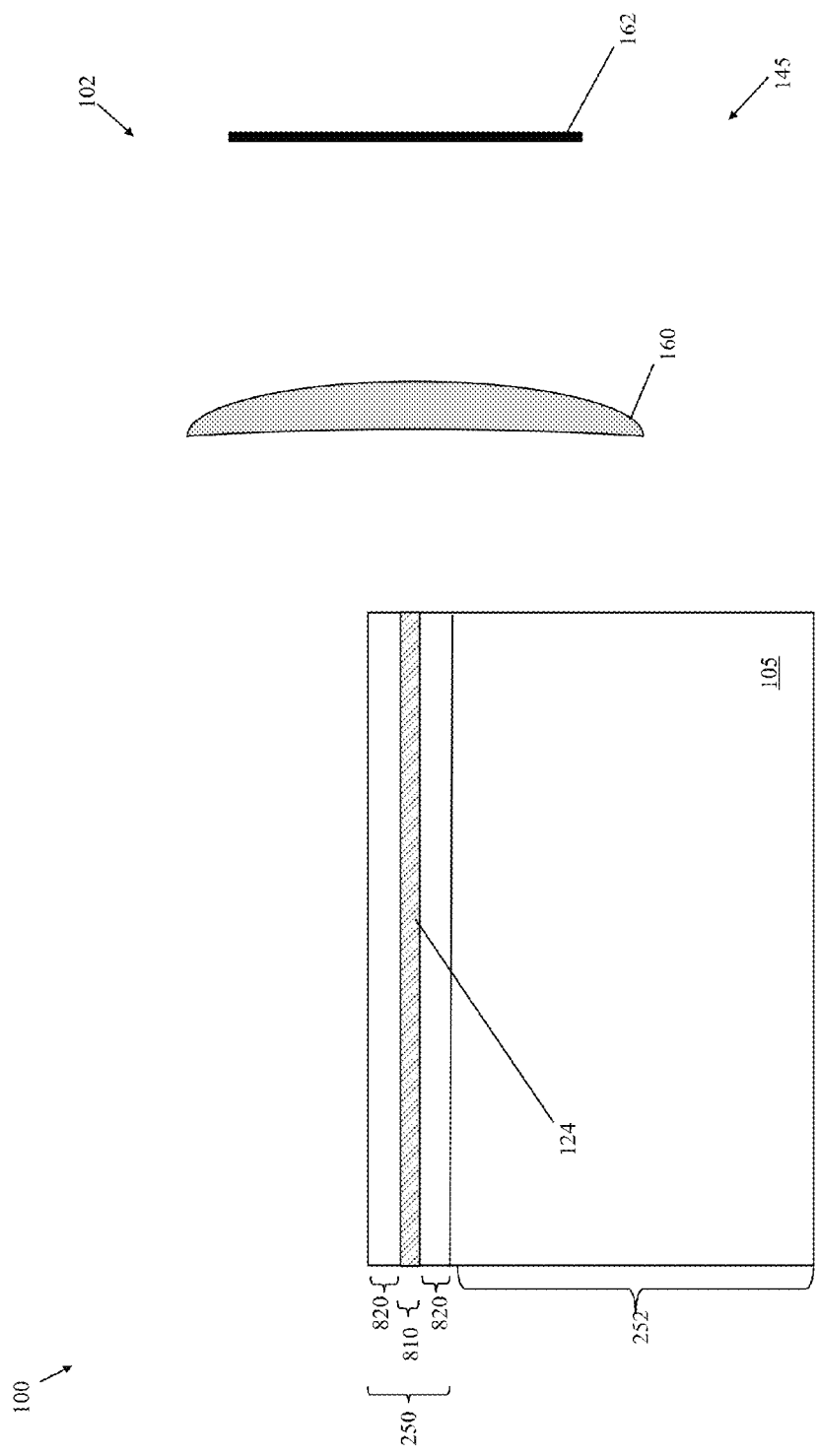
FIG. 8 presents a cross-sectional view of a detailed portion of the embodiment of the switch along view line 8-8, as depicted in FIG. 4.

FIG. 8 presents a cross-sectional view of a detailed portion of the embodiment of the switch 102 along view line 8-8 as depicted in FIG. 4. FIG. 8 depicts one waveguide of the first set of waveguides 122 and the waveguides end 124 along the edge of the PLC 105 and facing the lens 160 and mirror 162 of an embodiment of the optical beam steering assembly 145. As illustrated, to facilitate guiding the optical signal 116 to the end 124, in some embodiments, the waveguides of the set 122 can include a core portion 810 and a cladding portion 820. The core and cladding portions 810, 820 can be fabricated from the optical layer 250 of the PLC 105 using materials and procedures familiar to those skilled in the pertinent arts. For instance, in some embodiments, the lower portion of the cladding 820 can be composed of Silica (Silicon Oxide), the core portion 810 can be composed of Germanium doped Silica while the upper portion of the cladding can be composed of borophosphosilicate glass (BPSG) or phosphorus doped silica glass (PSG). These portions 810, 820 can be formed by conventional photolithographic patterning and etching procedures familiar to those skilled in the pertinent arts.

Figure 9:
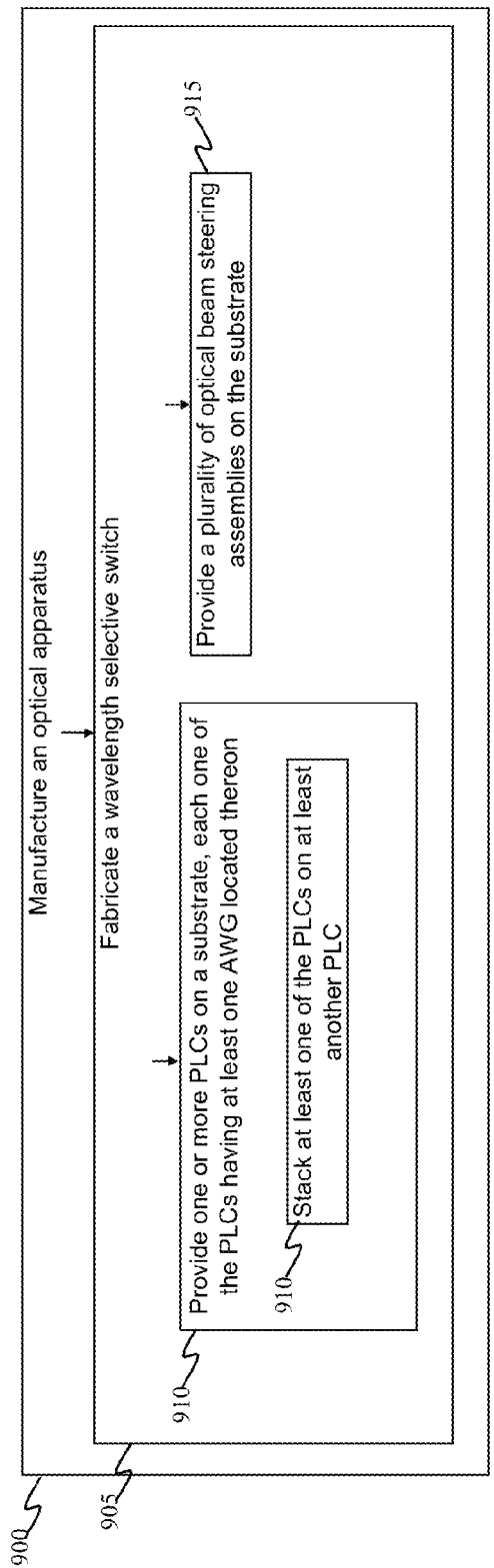
FIG. 9 presents a flow diagram of a method of manufacturing the apparatus, including manufacturing any embodiments of the apparatus discussed in the context of FIGS. 1-8.

Another embodiment is a method of manufacturing an optical apparatus. FIG. 9 presents a flow diagram of a method 900 of manufacturing the apparatus, including manufacturing any embodiments of the apparatus 100 discussed in the context of FIGS. 1-8.

With continuing reference to FIGS. 1-8 throughout, the method 900 includes a step 905 of fabricating a wavelength selective switch 102. Fabricating the switch 102 (step 905) includes a step 910 of providing one or more PLCs (e.g., one or more PLCs 105, 205, 305) on a substrate 168, each one of the PLCs having at least one AWG (e.g., at least one of AWGs 110, 112, 114) located thereon.

As part of providing the PLCs in step 910, a first AWG (e.g., AWG 110) on a first one of the PLCs (e.g., PLC 105) is configured to receive, an optical signal 116 having multiple wavelength channels from an input waveguide (e.g., waveguide 118) configured to carry an optical signal 116 having multiple wavelength channels (e.g., λ1 through λ10). The first AWG is also configured to separate the multiple wavelength channels into discrete wavelength channels (e.g., one of λ1 through λ10). The separated wavelength channels, e.g., from the first AWG 110 are each optically coupled to one end 130 of one of a first set of waveguides 122. Opposite ends 124 of individual waveguides of the first set of waveguides 122 are each separately located along an edge 130 of the first PLC 105 and spaced apart (e.g., by inter-channel separation distance 410) from each other. At least second and third AWGs (e.g., AWGs 112, 114) are optically coupled to one end (e.g., ends 132, 138) of second and third sets of waveguides (e.g., sets 134, 140), respectively. Opposite ends (e.g., ends 136, 142) of each one of the waveguides of the second and third sets 134, 140 are co-located with the opposite end 124 of the respective individual waveguide of the first set of waveguides 122.

Fabricating the switch 102 (step 905) includes a step 915 of providing a plurality of optical beam steering assemblies 145 on the substrate 168. As part of providing the assemblies 145 in step 915, each one of the beam steering assemblies 145 are configured to receive one of the discrete wavelength channels from the opposite end 124 of the individual waveguides of the first set of waveguides 122. Each one of the beam steering assemblies 145 are also configured to at least steer the one discrete wavelength channel either to the co-located opposite end 136 of the waveguide of the second set of waveguides 134, or, the co-located opposite end 142 of the waveguide of the third set of waveguides 140.

One of ordinary skill in the pertinent arts would be familiar with lithographic patterning and etching procedures to form the AWGs, the sets of waveguides, and optical beam steering assemblies, as part of steps 910 and 915. One of ordinary skill in the pertinent arts would be familiar with procedures to place the one or more PLCs on the substrate, e.g., with the aid of micro-manipulators, and to position the PLCs on the substrate such that the ends of the individual waveguides of the waveguide sets are aligned, e.g., with the aid of alignment markers, with the beam steering assemblies, as part of step 910.

In some embodiments, providing the PLCs (step 910) includes a step 920 of stacking at least one of the PLCs (e.g., PLC 105 or PLC 205) on at least another PLC (e.g., PLC 105, or 305). In some embodiments, as part of step 920, at least two of the PLCs can be stacked in a face-to-face arrangement. In some embodiments, as part of step 920, at least two of the PLCs can be stacked in a face-to-end arrangement. One of ordinary skill in the pertinent arts would be familiar with procedures, e.g., with the aid of micro-manipulators, to stack PLCs.

Figure 10:
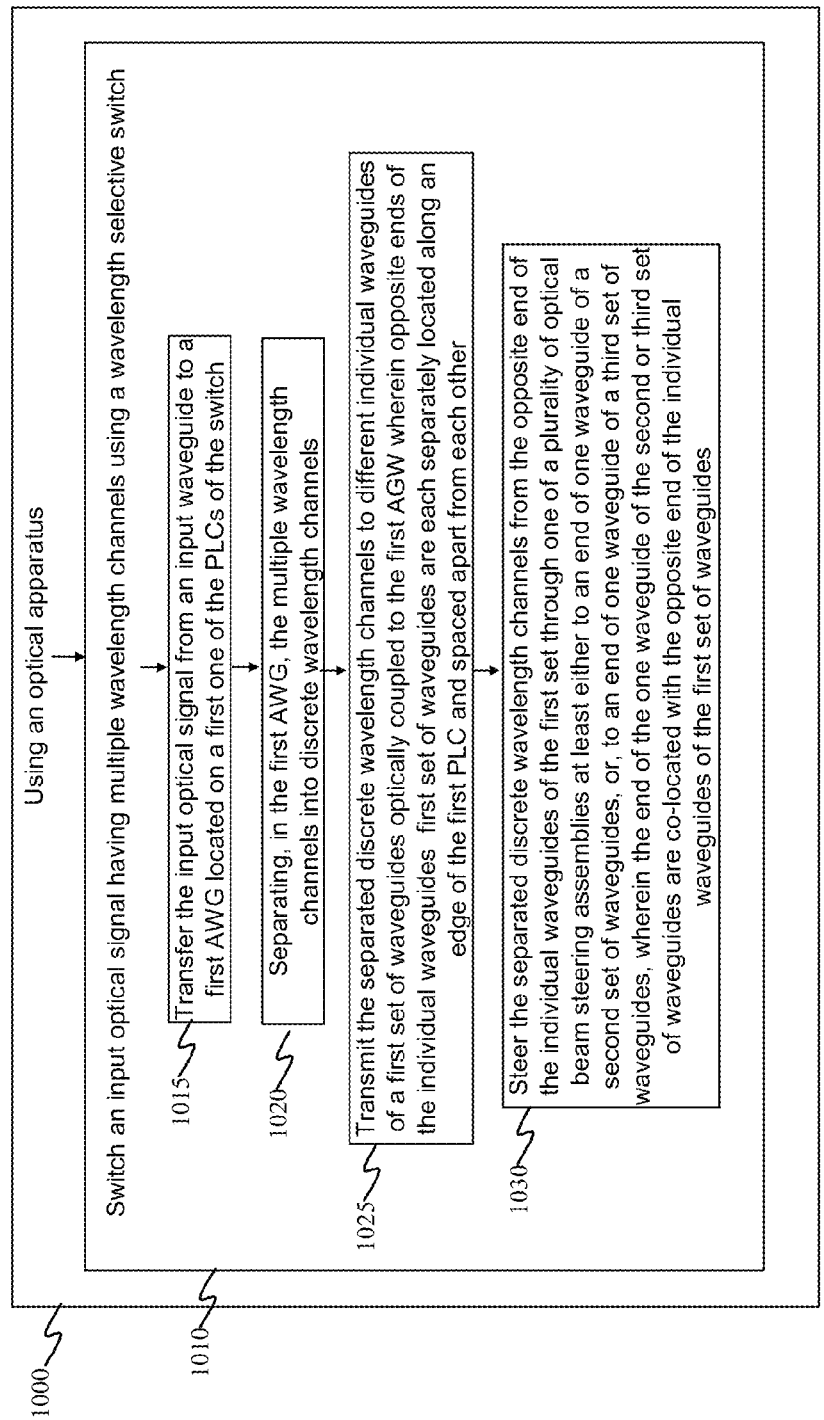
FIG. 10 presents a flow diagram of a method of using an optical apparatus, including using any embodiments of the apparatus discussed in the context of FIGS. 1-8.

Another embodiment is a method of using an optical apparatus. FIG. 10 presents a flow diagram of a method 1000 of using an optical apparatus, including using any embodiments of the apparatus 100 discussed in the context of FIGS. 1-8.

With continuing reference to FIGS. 1-8 throughout, the method 1000 includes a step 1010 of switching an input optical signal (e.g., signal 116) having multiple wavelength channels (e.g., λ1 through λ10) using a wavelength selective switch 102.

Switching (step 1010) includes a step 1015 of transferring the input optical signal 116 from an input waveguide (e.g. waveguide 118) to a first AWG (e.g., AWG 110) located on a first one of the PLCs (e.g., PLC 105) of the switch 102.

Switching (step 1010) includes a step 1020 of separating, in the first AWG 110, the multiple wavelength channels into discrete wavelength channels (e.g., individual ones of λ1 through λ10).

Switching (step 1010) includes a step 1025 of transmitting the separated discrete wavelength channels to different individual waveguides of a first set of waveguides 122 optically coupled to the first AWG 110 wherein opposite ends 124 of the individual waveguides of the first set of waveguides 122 are each separately located along an edge 130 of the first PLC 105 and spaced apart from each other (e.g., by a inter-channel separation distances 410).

Switching (step 1010) includes a step 1030 of steering, e.g., via a beam steering assembly 145, the separated discrete wavelength channels (e.g., one of λ1 through λ10) from the opposite end 124 of the individual waveguides of the first set 122 through one of a plurality of optical beam steering assemblies 145. The separated discrete wavelength channel is steered at least either to an end (e.g., end 136) of one waveguide of a second set of waveguides (e.g., set 134), or, to an end (e.g., end 142) of one waveguide of a third set of waveguides 140. The end 132, 142 of the one waveguide of the second or third set of waveguides 134, 140 are co-located with the opposite end 124 of the individual waveguides of the first set of waveguides 122.

In some embodiments, steering in step 1030 can include steering from the end 124 of the waveguides of the first set of waveguides 122 to one end 136, 142 of waveguides of other set of waveguides 134, 140 and other AWGs 112, 114 that are on the same PLC 105 as the first set of waveguides 122 and first AWG 110. In other embodiments, steering in step 1030 can include steering from the end 124 of the waveguides of the first set of waveguides 122 to one end 136, 142 of waveguides of other set of waveguides 134, 140 and other AWGs 112, 114 that are on the different PLC 205, 305 as the first set of waveguides 122 and first AWG 110.

Although the present disclosure has been described in detail, a person of ordinary skill in the relevant arts should understand that they can make various changes, substitutions and alterations herein without departing from the scope of the invention.

What is claimed is:

1. An optical apparatus, comprising:
a wavelength selective switch, the wavelength selective switch including:
one or more planar lightwave circuits, each one of the planar lightwave circuits having at least one arrayed waveguide grating located thereon, wherein:
a first arrayed waveguide grating on a first one of the planar lightwave circuits is configured to receive an optical signal having multiple wavelength channels from an input waveguide, and, to separate the multiple wavelength channels into discrete wavelength channels that are each optically coupled to one end of one waveguide of a first set of waveguides, wherein opposite ends of individual waveguides of the first set of waveguides are each separately located along an edge of the first planar lightwave circuit and spaced apart from each other, and
at least second and third arrayed waveguide gratings are optically coupled to one end of second and third sets of waveguides, respectively, wherein an opposite end of each one of the waveguides of the second and third sets are co-located with the opposite end of the respective individual waveguide of the first set of waveguides such that the co-located ends are a nearest grouping of ends as compared to other ends of the spaced apart waveguides of the first set of waveguides located along the edge of the first planar lightwave circuit; and
a plurality of optical beam steering assemblies, wherein each one of the beam steering assemblies are configured to receive one of the discrete wavelength channels from the opposite end of the individual waveguides of the waveguides of the first set of waveguide, and, to at least steer the one discrete wavelength channel either to the co-located opposite end of the waveguide of the second set of waveguides, or, the co-located opposite end of the waveguide of the third set of waveguides.

2. The apparatus of claim 1, wherein each of the beam steering assemblies includes a micro-electro-mechanical mirror configured to reflect the one discrete wavelength channel from the opposite end of the individual waveguides of the first set of waveguides to one of the co-located opposite ends of the waveguide of at least the second and third set of waveguides.

3. The apparatus of claim 2, wherein each of the beam steering assemblies includes a collimating micro-lens located between the opposite ends of the individual waveguides of the first, second and third sets of waveguides and a planar reflective surface of the micro-electro-mechanical mirror.

4. The apparatus of claim 1, wherein each of the beam steering assemblies includes a micro-electro-mechanical mirror having a concave reflective surface configured to reflect the one discrete wavelength channel from the opposite end of the individual waveguides of the first set to either of the co-located opposite end of the waveguides of at least the second and third set of waveguides.

5. The apparatus of claim 1, wherein the plurality of optical beam steering assemblies are arranged in a one-dimensional array.

6. The apparatus of claim 1, wherein the one or more planar lightwave circuits and the plurality of optical beam steering assemblies are located on a substrate of an optical telecommunication apparatus.

7. The apparatus of claim 1, wherein the first arrayed waveguide grating is configured as a de-multiplex device and the second and third arrayed waveguide gratings are configured as multiplex devices of an optical telecommunication apparatus.

8. The apparatus of claim 1, wherein the first, second and third arrayed waveguide gratings are located on the first planar lightwave circuit.

9. The apparatus of claim 1, wherein at least one of the waveguides of the first, second or third set of waveguides crosses at least one of the waveguides of the other of the set of waveguides.

10. The apparatus of claim 1, wherein the first arrayed waveguide grating is located on the first planar lightwave circuit and at least one of the second or third arrayed waveguide gratings is located on a second one of the planar lightwave circuits, wherein the first and second planar lightwave circuits are stacked together.

11. The apparatus of claim 1, wherein the first, second and third arrayed waveguide gratings are located on the first planar lightwave circuits, and further including fourth, fifth and sixth arrayed waveguide gratings located on a second one of the planar lightwave circuits, wherein fourth, fifth and sixth arrayed waveguide gratings are optically coupled to one end of fourth, fifth and sixth sets of waveguides, respectively, wherein:

opposite ends of each one of the waveguides of the fourth, fifth and sixth sets of waveguides are co-located with the opposite end of one of the waveguide of the first, second and third sets of waveguides, respectively, and each one of the beam steering assemblies are configured to receive one of the discrete wavelength channels from the opposite end of one of the waveguides of the first set of waveguides, and, to steer the one discrete wavelength channel to one of the co-located opposite ends of the waveguides of one of the second, third, fourth, fifth or sixth sets of waveguides.

12. The apparatus of claim 1, wherein a surface of the first planar lightwave circuit, that the first arrayed waveguide grating and first set of waveguides are located on, opposes a surface of a second planar lightwave circuit having at least one of the other arrayed waveguide gratings and one other set of waveguides located thereon, wherein locations of the other arrayed waveguide grating and other set of waveguide mirrors and locations of the first arrayed waveguide grating and first set of waveguides are arranged such that the opposite ends of the waveguides of the other set of waveguides are co-located with the opposite ends of the first set of waveguides.

13. The apparatus of claim 1 wherein the first arrayed waveguide grating is located on the first planar lightwave circuit, the second arrayed waveguide grating is located on a second one of the planar lightwave circuits and the third arrayed waveguide grating is located on a third one of the planar lightwave circuits, and, the first, second, and third arrayed waveguide gratings are stacked together.

14. The apparatus of claim 1, further including another planar lightwave circuit, wherein the first planar lightwave circuit and the other planar lightwave circuit are stacked together, and, a surface of the first planar lightwave circuit is separated from a surface of the other planar lightwave circuits that at least one other of the arrayed waveguide gratings is located on, by a base layer of either the first planar lightwave circuit or the other planar lightwave circuit.

15. The apparatus of claim 1, wherein the co-located opposite ends of adjacent ones of the waveguides of first, second and third sets are separated from each other by an intra-channel separation distance equal to at least about 0.015 mm.

16. The apparatus of claim 1, wherein each of the co-located opposite ends of the first, second and third waveguides are separated from other ones of the co-located opposite ends of the first, second and third waveguides that are configured to carry a different one of discrete wavelength channels, by at least about 0.5 mm.

17. The apparatus of claim 1, wherein the co-located opposite ends of pairs of adjacent ones of the waveguides of first, second and third sets are separated from each other by an intra-channel separation distance that differ from each other by at least about 50 percent.

* * * * *